Patented Oct. 6, 1936

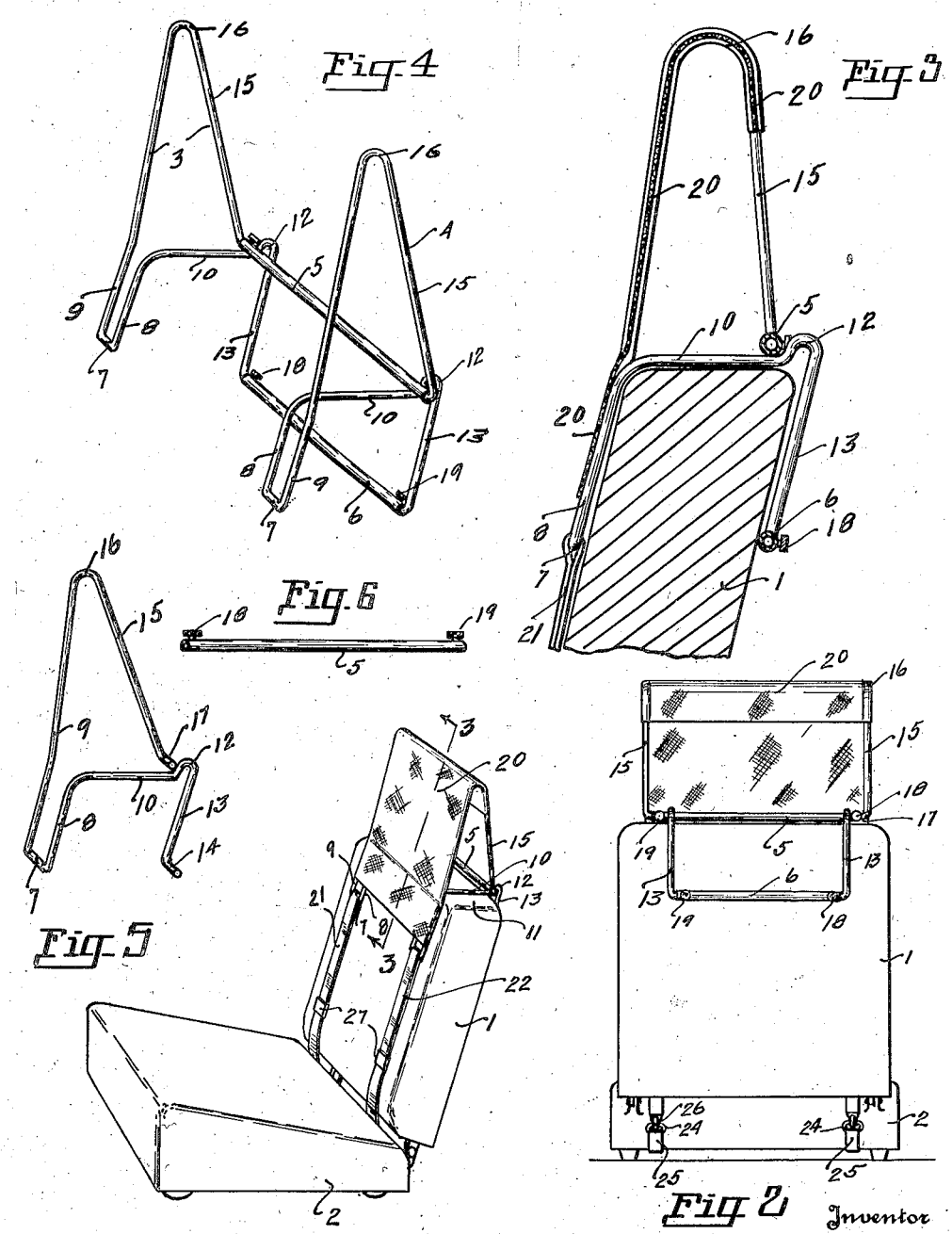

2,056,479

UNITED STATES PATENT OFFICE 2,056,479

COLLAPSIBLE HEADREST

Ulysses B. Newman, Portland, Oreg.

Application October 19, 1932, Serial No. 638,588

4 Claims. (Cl. 155—174)

The invention is comprised of two side frame members preferably made of suitable resilient material, as spring wire, that is adapted for being made to rest directly upon the back of a seat, as an automobile seat, or street car or train seat, and spacer bars are removably secured to the side frame members to maintain the same in suitable locked spaced relationship.

A flexible material, as canvas, is removably secured to the side frame members and acts as a rest for the head of the user of the same.

The primary purpose and object of my invention consists in providing a back rest for automobile and like seats that may be erected and maintained upon the seat and which may be collapsed and placed within a relatively small container for shipment and delivery to the ultimate consumer.

By the removing of the spacer bars the side frame members may be made to lie one upon the other and to encompass the same within a relatively small, inexpensive container, into which the same may be delivered to the ultimate consumer.

A still further object of my invention consists in providing a light, portable head rest for seats, that may be readily attached to and removed from the seat, with a minimum of delay, and which may be used by the user of the seat when the same is placed thereupon with comfort and convenience to the user of the same.

A still further object of my invention consists in so constructing my head rest assembly that the same may be shipped in knocked-down condition and in a relatively inexpensive and small container.

A still further object of my invention consists in so constructing my device that it will be comprised of a minimum number of parts.

A still further object of my invention consists in constructing the head rest of inexpensive materials and a head rest that may be adapted to a large range of seat sizes without change or alterations.

And a still further object of my invention consists in so making and assembling the device that the same may be knocked down and assembled in a small container and so delivered to the ultimate consumer. After delivery and the receipt of the device by the use the same may then be erected in place upon the back of the seat and used. After use the same may again be knocked down and reassembled in the original container and stored out of the way and in the small container until its use is again required.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a perspective, side view of a seat illustrating one of my new and improved head rests disposed thereupon and shown in erected position.

Fig. 2 is a rear view of the seat and a rear view of the head rest disposed thereupon, as illustrated in Fig. 1.

Fig. 3 is a sectional, side view of the assembled device, shown in position upon a seat back. This view is taken on line 3—3 of Fig. 1, looking in the direction indicated.

Fig. 4 is a perspective, side front view of the assembled device, illustrating the frame only.

Fig. 5 is a side view of one of the side frames.

Fig. 6 is a plan view of one of the spacer bars, shown removed from the side frames.

Like reference characters refer to like parts throughout the several views.

I have here shown my device in place upon the back 1 of any suitable seat assembly 2. My device is primarily comprised of side frame members 3 and 4. The side frame members are adapted for being spaced apart and for being secured together by spacer bars 5 and 6. The spacer bars are preferably made of tubular material, or for having sockets formed within their ends to adapt the side frame members thereto. The side frame members are preferably made of a single piece of resilient material, as spring wire. I form the side frame members by the forming of a central horizontal unit 7 and bend the material upward from the central portion, as at 8 and 9.

From the upwardly extending bar 8, I form a horizontal portion 10, that is adapted for extending over the top 11 of the seat to which the same is to be attached.

One or more stops 12 upwardly extend from the horizontal portion 10 that acts as a stop and support for the lower spacer bar 6. A downwardly extending leg 13 is formed from the material adjacent the stop 12 and a foot 14 inwardly extends from the downwardly extending leg 13. The upwardly extending bar 9 extends substantially above the horizontal portion 10 and a brace 15 downwardly extends from the curved top 16 and a foot 17 inwardly extends and terminates the lower end of the brace 15. The side frame members 3 and 4 are made right and left handed, in order that the spacer bars 5 and 6 may be secured to the feet 14 and 17 respectively and which operate the same.

Clamping screws 18 and 19 are secured to each of the spacer bars and which securely clamp the side frames in spaced relationship with each other and to the spacer bars. A resilient head rest cover, made of any suitable material as canvas, is removably secured to the upwardly extending bars 9 over the curved portion 16 and down a sufficient distance upon the brace 15, as illustrated in Fig. 3 to form a suitable cushion support for the head of the user of the device. Fastening strips 21 and 22 are secured to the horizontal portions 7 of the side frames and the straps are preferably made long enough to go around or extend below the bottom 23 of the back and which adapts the same for being secured to any suitable ring 24 that terminates strips 25, that are secured to the bottom of the seat. A hook 26 terminates the strap and adapts the same for being easily attached and detached to the rings 24. A suitable running buckle 27 is disposed upon the strap to accommodate the same to the lengths of seat backs of different sizes.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A device of the class described, comprising two independent frame members with parallelly related parts, said frame members held apart in spaced relation with each other by removable spacer elements, each of said frame members comprising a single piece of material formed with three parallel and vertically extending portions and an upwardly and rearwardly projecting portion extending from one of said vertical portions and an angularly downwardly disposed end portion, one of said vertically extending portions and said end portion terminating in right angularly inwardly extending parallel terminal portions.

2. A device of the class described, comprising two independent frame members with parallelly related parts, a plurality of spacer elements holding the frame members in spaced relationship, each of said frame members comprising a single piece of material formed with three parallel and vertically extending portions, one of which terminates in an upwardly and rearwardly then downwardly and rearwardly extending portion, another of said vertical portions forming the other terminus of the frame.

3. A collapsible head rest, comprising a pair of side frame members with parallelly related parts, each side frame member being formed of a single piece of resilient material and comprising three parallel and vertically extending portions and an upwardly extending portion from one of said vertical portions and an angularly downwardly disposed end portion extending from the upwardly extending portion, two of said parallel vertical portions lying in a common plane and the third parallel vertical portion lying in a plane spaced apart from the common plane, said third vertical portion and said angularly downwardly disposed end portion terminating in right angularly inwardly extending parallel terminal portions, and removable spacer elements adapted to the corresponding terminal portions of each frame member for spacing apart the frame members.

4. A collapsible head rest, comprising a pair of side frame members with parallelly related parts, each side frame member being formed of a single piece of resilient material and comprising three parallel and vertically extending portions and an upwardly extending portion extending from one of said vertical portions and an angularly downwardly disposed end portion extending from the upwardly extending portion, two of said parallel vertical portions lying in a common plane and the third parallel vertical portion lying in a plane spaced apart from the common plane, said angularly downwardly disposed end portions terminating in right angularly inwardly extending parallel terminal portions, and a removable spacer element adapted to the terminal portion of each frame member for spacing the frame members apart.

ULYSSES B. NEWMAN.